United States Patent [19]
Shibuya et al.

[11] Patent Number: 5,963,353
[45] Date of Patent: Oct. 5, 1999

[54] OPTICAL DEFLECTOR AND ADJUSTING METHOD THEREOF

[75] Inventors: Satoshi Shibuya; Masao Itoh; Naoji Kamimura, all of Hachioji, Japan

[73] Assignee: Konica Corporation, Japan

[21] Appl. No.: 09/040,844

[22] Filed: Mar. 18, 1998

[30] Foreign Application Priority Data

Mar. 24, 1997 [JP] Japan .................................. 9-069402
Mar. 27, 1997 [JP] Japan .................................. 9-074842

[51] Int. Cl.$^6$ ............................................. G02B 26/08
[52] U.S. Cl. ........................ 359/198; 359/200; 359/216; 359/217
[58] Field of Search ............................... 359/198, 200, 359/216–219, 850, 855, 871, 872, 900

[56] References Cited

U.S. PATENT DOCUMENTS

| | | | |
|---|---|---|---|
| 5,420,713 | 5/1995 | Kunii | 359/198 |
| 5,663,827 | 9/1997 | Ono et al. | 359/216 |
| 5,763,967 | 6/1998 | Kurosawa et al. | 310/45 |

*Primary Examiner*—James Phan
*Attorney, Agent, or Firm*—Jordan B. Bierman; Bierman, Muserlian and Lucas

[57] ABSTRACT

In an assembling method of an optical deflection apparatus in which a polygonal mirror is fixed on an outer ring of a radial bearing and an optical scanning is conducted by a rotation of an inner ring of the radial bearing, the assembling method includes the steps of placing the polygonal mirror on the outer ring of the radial bearing wherein the polygonal mirror and the outer ring of the radial bearing have an engagement portion including an adhering portion with a gap having a distance between the polygonal mirror and the outer ring of the radial bearing; adjusting a tilt angle of the polygonal mirror with respect to the outer ring of the radial bearing; and filling an adhesive in the gap of the adhering portion under the adjusted condition, thereby integrally fixing the polygonal mirror and the outer ring of the radial bearing.

7 Claims, 8 Drawing Sheets

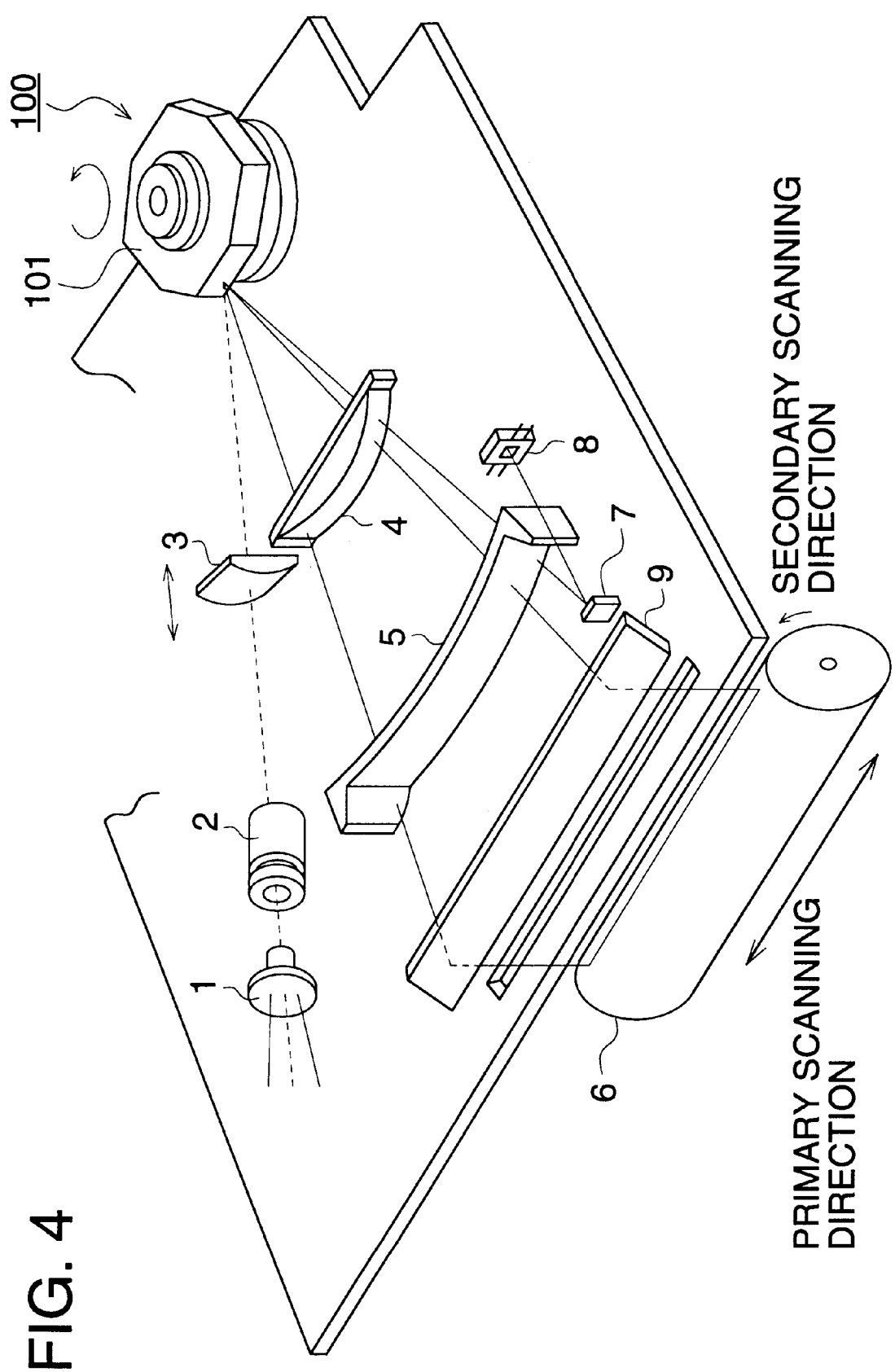

OPTICAL DEFLECTOR AND ADJUSTING METHOD THEREOF

BACKGROUND OF THE INVENTION

This invention relates to an optical deflector, which is used for light-scanning in image recording apparatus such as laser printers, a method of assembling the deflector, an adjusting method of the deflector, and an apparatus of adjusting the deflector.

In image recording apparatus such as laser printers, the image recording is made according to the image information, which has been read, in the following manner: a laser beam is made to be incident on a polygonal mirror and to reflect to be projected onto a photoreceptor surface to scan it. FIG. 4 shows a perspective view of the writing optical system equipped with the optical deflector 100. The laser beam emitted from the semiconductor laser 1 becomes a parallel pencil of light by the collimator lens 1 of the beam-shape regulating optical unit, passing through the first cylindrical lens 3, and is reflected to be deflected by the polygonal mirror 101 of the optical deflector 100; then, it passes through the Fθ lens 4 and the second cylindrical lens 5 to be projected onto the photoreceptor drum 6 via the reflecting mirror 9 for scanning the photoreceptor with a predetermined spot diameter in the primary scanning direction. The synchronizing per every scanning line is detected by causing the laser beam before starting to scan the line to enter the synchronization detector 8 via the mirror 7.

In the scanning optical system like this, a very small error of the tilt angle of the polygonal mirror results in the fluctuation of the scanning line and the distortion of the image, deteriorating the image quality. This becomes more remarkable with the higher rotational speed of the polygonal mirror for the higher recording density.

The polygonal mirror is directly fixed to the rotary shaft of the motor to be used at lower rotational speeds, however, in case of higher rotational speeds, the driving-rotating with an air bearing is practiced; that is, the polygonal mirror is fixed to the outer ring of the radial bearing and rotates floating without contacting the inner ring of the radial bearing. The applicant has disclosed the technology relating to the optical deflector having a hydrodynamic bearing part in the Japanese laid open patents H7-243437, H7-259849, H8-114219, H8-121471, and so forth; FIG. 5 is a cross-sectional view showing the structure of the optical deflector having the hydrodynamic bearing part composed of the upper thrust plate 124, lower thrust plate 123, and the inner ring 125. Referring to FIG. 5, the inner ring 125, the lower thrust plate 123, and the coil 126 for producing the static magnetic field, all arranged concentrically and united with the base plate 121, make up the hydrodynamic bearing part 120. Further, the ring-shaped magnet 106, the outer ring 104 made of aluminum, the outer ring 102 made of a ceramic material, the polygonal mirror 101, and the mirror holder 103, with the polygonal mirror nipped by the outer ring 104 and the mirror holder 103 like a sandwich, all arranged concentrically and assembled unitedly, make up the rotor 110. The rotor 110 is fitted to the outside of the aforesaid inner ring 125, and then the upper thrust plate 124 is fixed concentrically to the inner ring 125. In addition, small gaps having spacings of 3–10 μm are formed between the opposite surfaces, that is, between the peripheral surface of the inner ring and the inner surface of the outer ring, between the bottom surface of the upper thrust plate 124 and the top surface of the outer ring 102, and between the top surface of the lower thrust plate 123 and the bottom surface of the outer ring 102; when rotating, the rotor 110 floats in the air without contacting the hydrodynamic bearing part 120 to keep smooth rotation.

For obtaining a good image quality, it is necessary to make the tilt angles of the polygonal mirror, and the accuracy of the machine-processing and the assembling process for the polygonal mirror, the rotor portion fitted with it, and the hydrodynamic bearing part should be especially high.

As mentioned above, the measures to make the tilt angles small to the utmost are dependent on making the accuracy higher for each of the parts and for assembling them, and such working process engineering or assembling process engineering requires high-precision machine tools and a high-degree technical skill, resulting in high manufacturing costs. Furthermore, if the thermal expansion coefficients of the parts are different from one another, it is inevitably difficult to keep the high accuracy stably and obtain durability.

SUMMARY OF THE INVENTION

It is an object of the invention by solving such problems of the prior art to provide an optical deflector and a method of assembling thereof capable of fixing the polygonal mirror to the outer ring of the radial bearing, the optical deflector and its assembling method decreasing the number of parts to eliminate the influence of thermal expansion and others, reducing the variation of vibration to secure the stability at high speed, aiming at better image quality by minimizing the fluctuation of surface flatness of the mirror, resulting in a stable, high quality of scanning image.

Another object of the invention is to provide a method of adjusting the optical deflector and its adjusting apparatus capable of adjusting the tilt angles with regard to the shaft portion of the polygonal mirror or the outer ring of the radial bearing with an extremely high accuracy to minimize them and fixing the mirror.

The first object mentioned above is accomplished by the optical deflector which deflects light for scanning operation by the rotation of the outer ring of the radial bearing fitted with the polygonal mirror around the fixed inner ring, characterized by having an adhesive portion provided between the opposite surfaces of the engaging portion of said polygonal mirror and said outer ring with a gap, the gap at said adhesive portion being filled with an adhesive to fix said polygonal mirror and said outer ring united to one body, and by the assembling method of said optical deflector which deflects light for scanning operation by the rotation of the outer ring of the radial bearing fitted with the polygonal mirror around the fixed inner ring, characterized by that an adhesive portion is provided between the opposite surfaces of the engaging portion of said polygonal mirror and said outer ring with a gap, and the gap at said adhesive portion is filled up with the adhesive to fix said polygonal mirror and said outer ring united to one body, while said polygonal mirror in engagement relation has already been adjusted for its tilt angles with regard to said outer ring.

Moreover, it is desirable that the aforesaid polygonal mirror and outer ring have the gap portion having two sub-portions of different spacings for positioning and for adhesive-filling at the aforesaid adhesive portion, and also it is desirable that the aforesaid adhesive has in its solidified state a modulus of longitudinal elasticity not less than 7000 kgf/mm$^2$ and a coefficient of thermal expansion not greater than $2 \times 10^{-5}$/° C.

The aforementioned second object is accomplished by an adjusting method of the optical deflector, characterized by that, before fixing the polygonal mirror to the rotary shaft of the motor or to the outer ring of the radial bearing, the tilt angle of each of mirror surfaces of said polygonal mirror is measured with regard to said rotary shaft or said outer ring to adjust the inclination of said polygonal mirror in the direction of decreasing the dispersion of measured values of said tilt angle, and by an adjusting apparatus of the optical deflector, characterized by having a tilt-angle measuring instrument for measuring said tilt angle of the mirror surfaces composed of a light source to irradiate said mirror surfaces of the polygonal mirror and a photodetector for detecting the reflected light from said mirror surfaces, an inclination-angle adjusting means for the polygonal mirror composed of a pushing member operating to push the polygonal mirror in the direction parallel to its axis, and a control unit to control said tilt-angle adjusting means in the direction of decreasing the dispersion of the measured values of said tilt angle of the mirror surfaces by said tilt-angle measuring instrument, and making the adjustment of the positional relation between the motor shaft or the outer ring of the radial bearing and the polygonal mirror outside mated with each other.

BRIEF DESCRIPTION OF THE DRAWINGS

FIG. 3(a)-1 through FIG. 3(c)-2 are illustrations showing the examples of assembling the polygonal mirror and the outer ring of the radial bearing;

FIG. 4 is a perspective view of the writing optical system;

DETAILED DESCRIPTION OF THE PREFERRED EMBODIMENTS

THE EMBODIMENT OF THE ASSEMBLING METHOD

Figure 1:
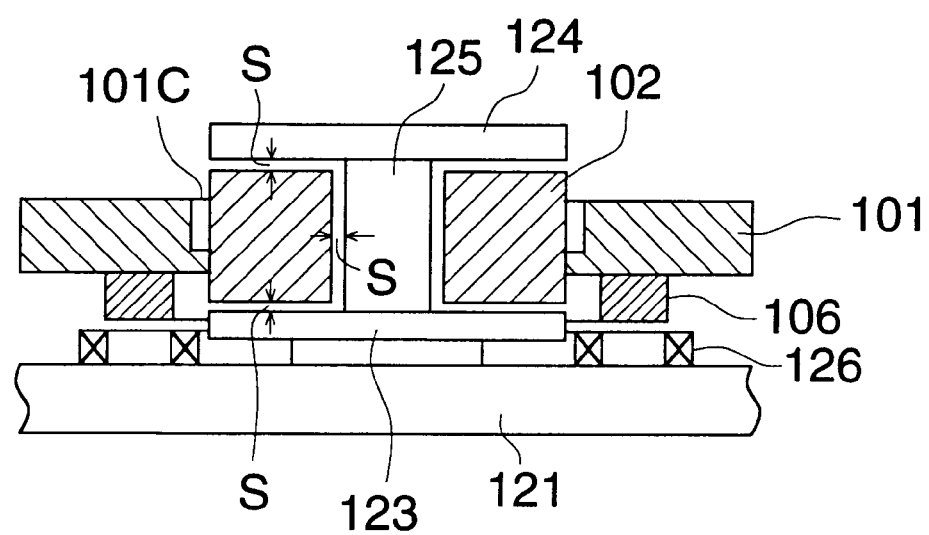
FIG. 1 is a cross-sectional view showing the structure of the optical deflector according to one mode of practice of this invention.
Figure 5:
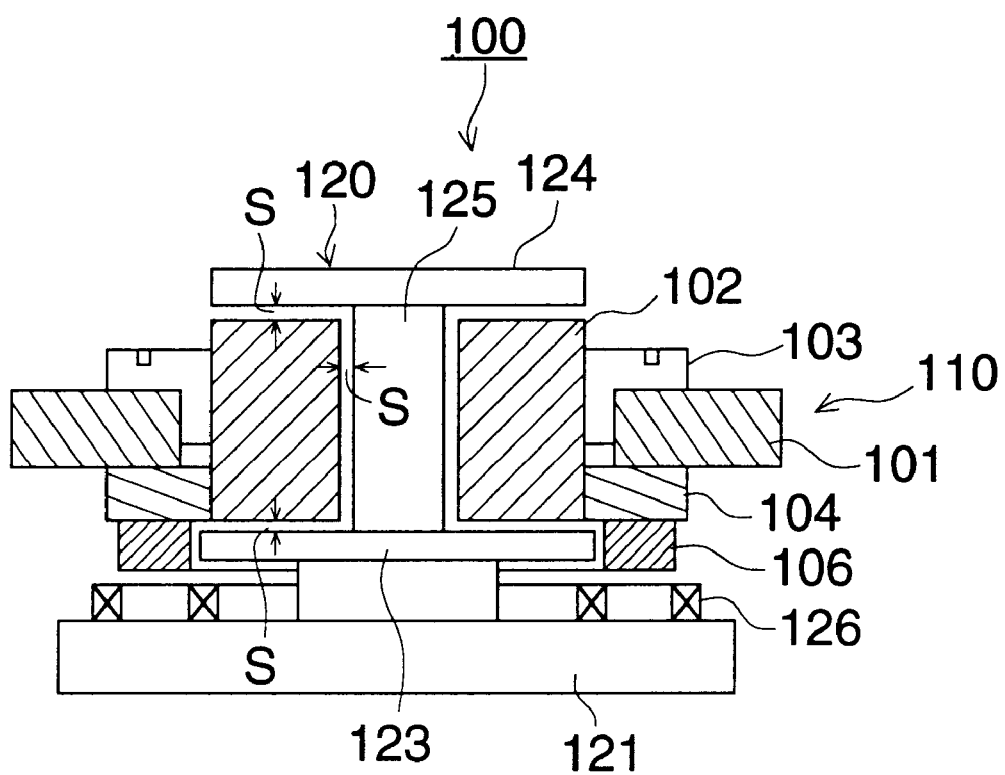
FIG. 5 is a cross-sectional view showing the structure of the optical deflector of the prior art.

Before explaining the embodiment of the assembling method of the optical deflector of this invention, the explanation will be given concerning the cross-sectional view of the optical deflector to which the assembling method of this invention is favorably applied. As shown in FIG. 1, the number of parts requiring high-accuracy processing is decreased, compared with the optical deflector of the prior art, the structure of which is shown in the cross-sectional view of FIG. 5, and the polygonal mirror 101 is fixed to the outer ring of the radial bearing 102 with an adhesive to make up one body, while the tilt angle of each surface has been adjusted by the adjusting method which will be described later. In other words, the ring-shaped magnet 106 for rotary magnetic field is fixed to the polygonal mirror 101 to make up one body, and the outer ring 104 and mirror holder 103, which have been used heretofore for assembling the sandwich-like structure to hold the polygonal mirror between them, are eliminated. Thus the fluctuation of the flatness of the mirror and the deformation and vibration due to the difference of thermal expansion coefficient between the parts, which are easy to occur in the prior art, wherein the polygonal mirror 101 is held and clamped like a sandwich between them, are made decreased.

Figure 2:
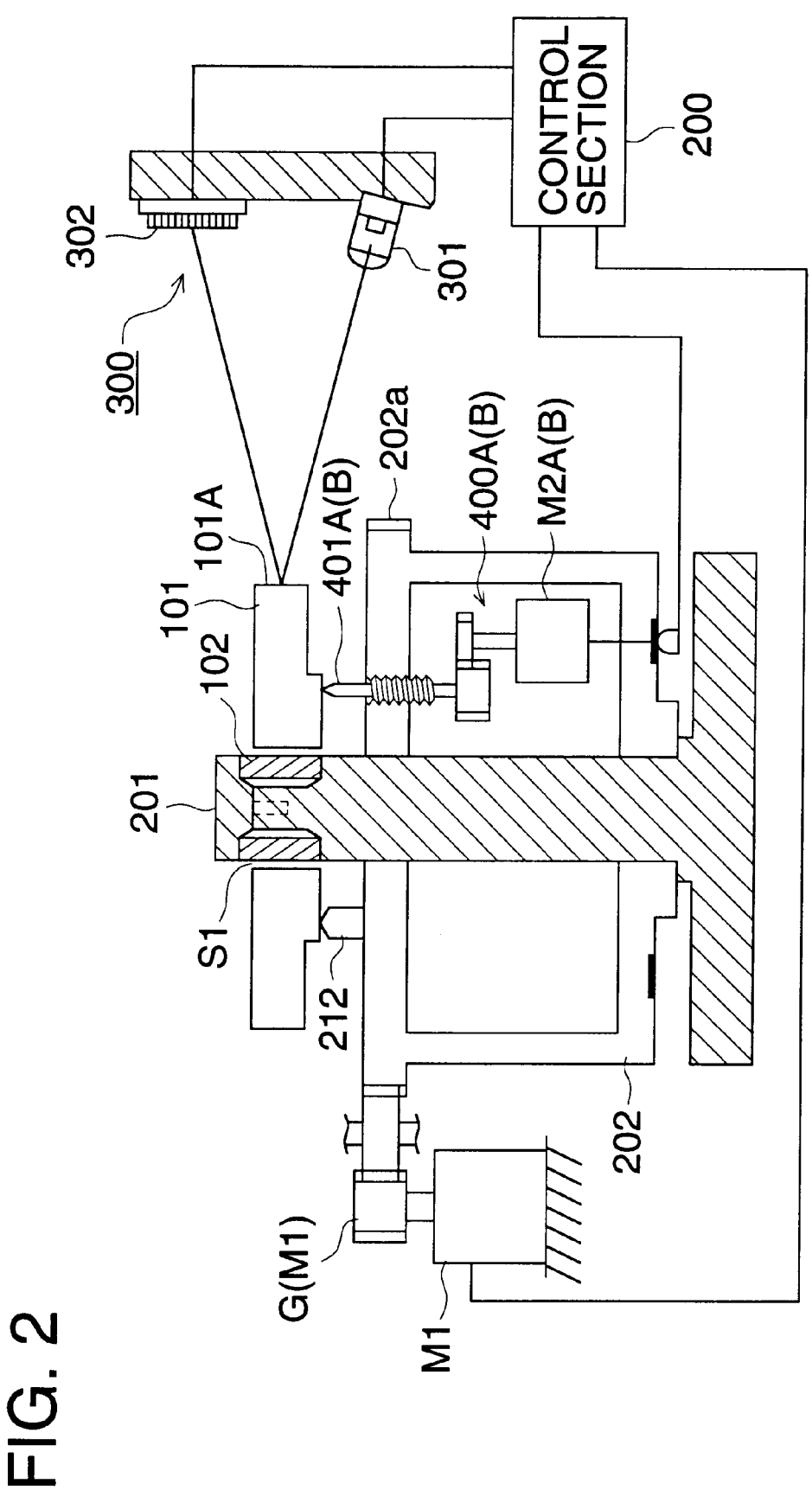
FIG. 2 is a cross-sectional view showing the structure of the adjusting apparatus of the optical deflector.

According to the assembling method of the optical deflector by this invention, the polygonal mirror is fixed to the outer ring of the radial bearing to make up one body in the well-adjusted state made by the adjusting method, for example, as shown in FIG. 2. Regarding the adjusting method, detailed explanation will be given later. Briefly stating, the method consists of measuring the tilt angle of each of the mirror surfaces by an optical measuring instrument and adjusting the inclination of the polygonal mirror with regard to the outer ring so as to decrease the measured values and its dispersion by a controller and inclination adjusting means placed at two positions.

According to the assembling method of the optical deflector by this invention, the engaging portion of the polygonal mirror 101 and the outer ring of the radial bearing 102 are filled up with an adhesive to make them united as one body, while the tilt angle adjustment of the polygonal mirror 101 as mentioned above has been made with regard to the outer ring. FIG. 3(a)-1 through FIG. 3(c)-2 shows the plan views of examples of the embodiment of this invention and the cross-sectional views for each of them at the pertinent portion through arrow marks.

Figures 1, 3A:
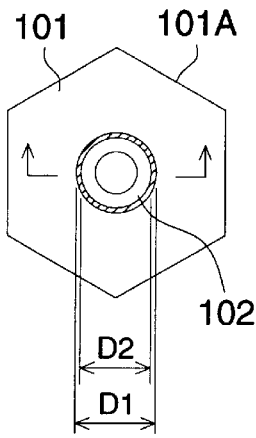
Figures 2, 3A:
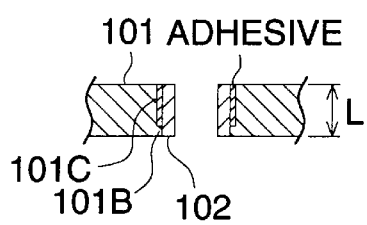

In the case of the example shown in FIGS. 3(a)-1 and 3(a)-2, the polygonal mirror 101 engages with the outer ring 102 at the fitting portion 101B for positioning, which is relatively short in the axial direction, and provided at the lower part of the engaging portion, to be positionally regulated, and the adhesion portion 101C located to the axially upper direction of the fitting portion 101B is filled up with an adhesive to fix the mirror. The adhesive is injected from the injecting clearance along the whole circumference, and the fixing is made uniformly over the whole circumferential area.

Figures 1, 3B:
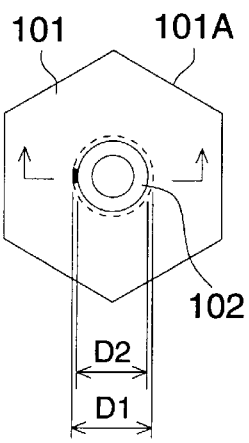
Figures 2, 3B:
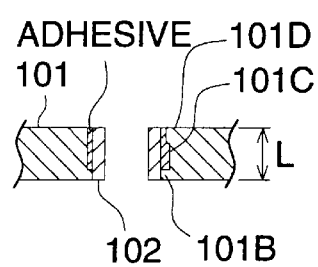

In the case of the example shown in FIGS. 3(b)-1 and 3(b)-2, the polygonal mirror 101 engages with the outer ring 102 at the fitting portion 101B and free portion 101D, which are both relatively short in the axial direction, and the former is located at the lower part of the engaging portion for positioning while the latter at the upper part in loose fitting relationship, and the adhesive portion 101C located at the intermediate part is filled up with the adhesive to fix the mirror. Further, the adhesive is injected from the injection opening 101E of the free portion 101D located at the upper part to make the adhesive bonding over the whole circumferential area. Injecting the adhesive from the injection opening of the above-mentioned shape 101E into the adhesion portion 101C results in the decreasing effect of the unevenness in the adhesive coating and adhesive strength.

Figures 1, 3C:
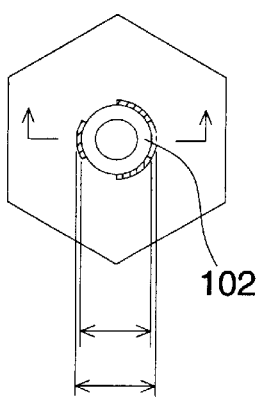
Figures 2, 3C:
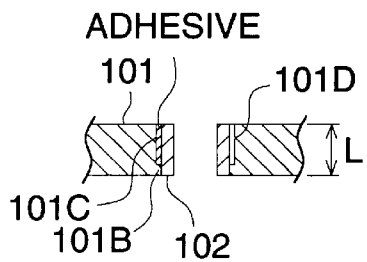

Furthermore, in the case of the example shown in FIGS. 3(c)-1 and 3(c)-2, the polygonal mirror 101 engages with the outer ring 102 at the fitting portion 101B and free portion 101D; the former is relatively short in the axial direction and located at the lower part of the engaging portion for positioning, while the latter is in loose fitting relationship and provided with the adhesion portions at several, for example three, positions to be filled up with the adhesive for making adhesion. With such shape, the adhesive can be effectively used and relatively small amount of the adhesive secures necessary adhesion strength and firm fixing to make up a united body.

The diagonal length of the mirror surface of the polygonal mirror 101 made of pure aluminum material etc. is in the range of 30 mm–80 mm, and for the engaging portion of the polygonal mirror and the outer ring 102, the length in the axial direction in the range of 3 mm–12 mm are generally used. Further, for the difference ($D_1-D_2$) between the inner and outer diameters at each of the adhesion portions 101C in the above-mentioned examples, about 2×1 mm is favorably set to carry out the adhesive bonding of the polygonal mirror 101 to the outer ring 102 with its tilt angle adjusted already. The larger difference between the outer and inner diameters at each adhesion portion 101C than the above-mentioned spacing results in the unfavorable effect such as shrinkage etc. to raise some problems in keeping the dimensional accuracy after solidification; the smaller difference than the above-mentioned spacing makes it difficult for the adhesive to permeate evenly to the whole surfaces of the adhesion portions.

As the adhesive for filling up each of the adhesion portions 101C, some inorganic adhesive having room temperature setting property is favorably used, and using such kind of adhesive makes it possible to fill up the adhesive portions 101C with the adhesive even before the adjustment of the tilt angle of the polygonal mirror and to carry out the adjustment before its setting. Further, it is necessary that the adhesive has in its solidified state a modulus of longitudinal elasticity not less than 7000 kgf/mm$^2$ and a thermal expansion coefficient not greater than $2\times10^{-5}$/° C. As the adhesive, for example, Threebond 3732 manufactured by Threebond may be used. By satisfying above-mentioned conditions, the mechanical strength of the adhesion portion is maintained and the deformation by the stress during the rotation of the polygonal mirror can be prevented, and still further the influence of the variation of the environmental temperature etc. can be neglected. Moreover, the mechanical strength of the adhesive enough for the usage can be secured by satisfying the above-mentioned conditions in the solidified state. In addition, it is desirable that the moduli of the longitudinal elasticity and the thermal expansion coefficients of the polygonal mirror 101 and the outer ring 102 are not so much different from those of the adhesive, and besides the above, enlarging the substantial area of adhesion by making the surfaces of the adhesion portions 101C coarse by roughening etc. eliminates the risk of peeling off etc. at the adhesion surfaces.

To add to the above explanation, wherein the example is shown that by making the polygonal mirror 101 having a step portion with a little different diameters inside the inner cylindrical surface engage with the outer ring 102, the fitting portion and the adhesion portion are formed between them, however on the contrary to this, according to this invention, it may well be available such structure that by making the polygonal mirror 101 having an even cylindrical inner surface engage the outer ring having a step portion with a little different diameters on the outer cylindrical surface, the fitting portion and the adhesion portion are formed between them.

According to this invention, bonding the polygonal mirror to the outer ring with the adhesive enables it to eliminate the members heretofore used which expand or contract with the temperature variation, thus the optical deflector and the assembling method, which decrease the variation of the dynamic balance with the temperature variation, and also decrease the fluctuation of the flatness of the mirror, and furthermore are designed to reduce the number of the parts and the assembling time to a large extent, have now been provided.

Furthermore, by providing the sub-portions of different spacings at the engaging portion of the polygonal mirror and the outer ring, the outflow of the adhesive from the engaging portion has been prevented, that has resulted in the effective filling up by the adhesive.

The adjusting apparatus of the optical deflector according to this invention will now be explained on the basis of the two embodiments in the following. However, the invention should not be confined to these embodiments.

THE FIRST EMBODIMENT OF THE ADJUSTING METHOD

With reference to FIG. 2, FIG. 6, and FIGS. 7(a)–7(c), the adjusting apparatus of the optical deflector according to the first embodiment will be explained.

Under the title of this first embodiment, the explanation is given concerning the adjusting apparatus which adjusts the angle of the inclination of the polygonal mirror mated with the outside of the outer ring of the radial bearing, to control the tilt angle of each of the mirror surfaces of the polygonal mirror in such a manner as to make the dispersion of measured values extremely small, however in the case of being mated with the motor shaft in place of the outer ring the adjusting is made in quite the same manner.

Figure 6:
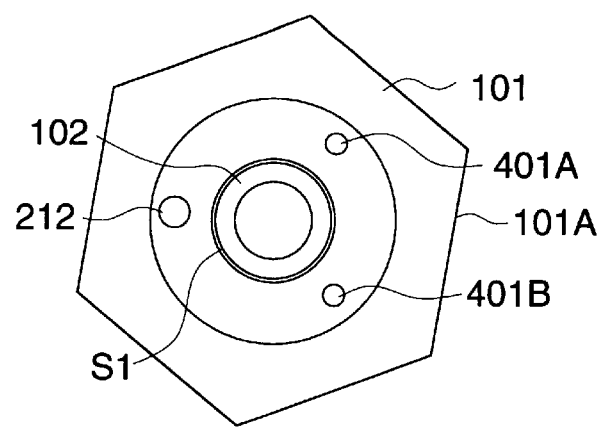
FIG. 6 is the plan view of the polygonal mirror portion in the first embodiment of the adjusting method according to this invention.

As shown in FIG. 6, there is provided the gap S1 between the outer circumference of the outer ring of the radial bearing 102 and the inner circumference of the polygonal mirror 101. This gap S1 is filled up with the adhesive after the adjustment explained in the following to become in the solid-bonded state.

FIG. 2 is a cross-sectional view showing the structure of the adjusting apparatus for illustrating an example of the adjusting method of the optical deflector. The outer ring of the radial bearing 102 is fixed by the shaft-portion fixing means 201. Outside said shaft-portion fixing means 201 there is provided the rotating means 202 which rotates around the center axis of the outer ring 102, driven by the rotation of the motor M1. On the upper surface of the rotating means 202, the polygonal mirror 101 which is mated with the outside of the outer ring 102 is placed, supported at the three points positioned at the angle of approximately 120° to one another. As shown in FIG. 6, among the three supporting points, one is for the fixed supporting portion 212 and another two are for the inclination-angle adjusting device 400A and 400B for the polygonal mirror 101 composed of the pushing member 401A and 401B respectively, which operate to push the mirror in the direction parallel to the center axis of the polygonal mirror 101. (In the drawing only the inclination-angle adjusting device 400A is shown; the inclination-angle adjusting device 400B has the same structure.) Moreover, 300 is the tilt-angle measuring instrument for measuring the tilt angle of the mirror surface 101A composed of the light source 301 to irradiate a small spot of said mirror surface 101A and the photodetector 302 detecting the reflected light beam from the mirror surface 101A, and obtains the values of tilt angle of the mirror surface 101A through the position of detecting the light beam. The control unit 200 drives the motor M1 to rotate the rotating means 202, which rotates the polygonal mirror 101 placed on its upper surface for measuring the tilt angle of each mirror surface 101A, the range of the measured values of the tilt angle being calculated. Further, the control unit 200 makes the pushing members 401A and 401B of the inclination-angle adjusting device 400A and 400B slightly move up or down to make the adjustment in accordance with the program set beforehand and measures the tilt angle after the slight adjustment to obtain the values of tilt angle and calculate the range, then again causes the pushing members 401A and 401B to move slightly in the direction to decrease the range to be calculated, thus the adjustment operation is to be continued until the range becomes within the allowed limit.

The adjusting apparatus having above-mentioned structure is controlled by the adjusting program for the optical deflector which the control unit has in its memory in such a manner as to minimize the range of the measured values of the tilt angle of the mirror surface of the polygonal mirror 101. The adjusting program will be explained in the following.

(1) The control unit 200 drives the motor M1 to rotate supporting table 202 slowly.

Figure 7:
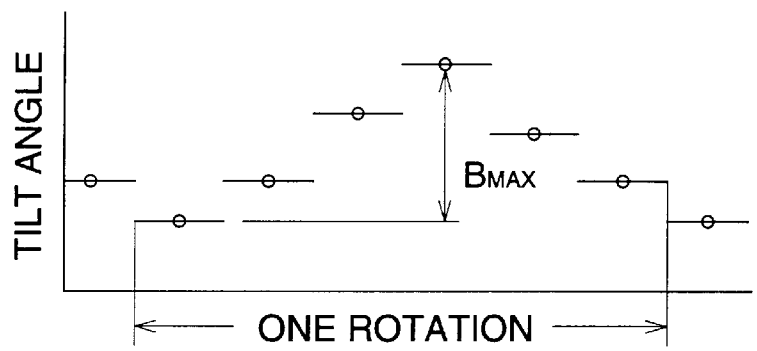
FIGS. 7(a)–7(c) are illustrations showing the process of the adjustment of tilt angles according to the first embodiment of the adjusting method.
Figure 7:
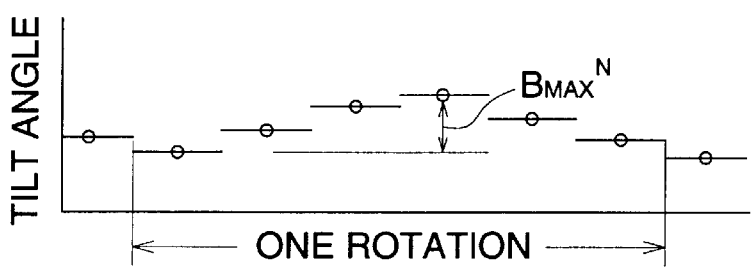
Figure 7:
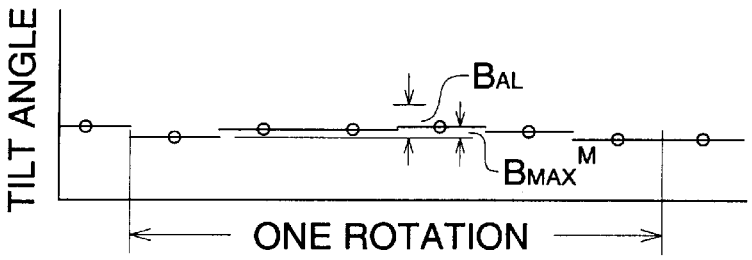
Figure 8:
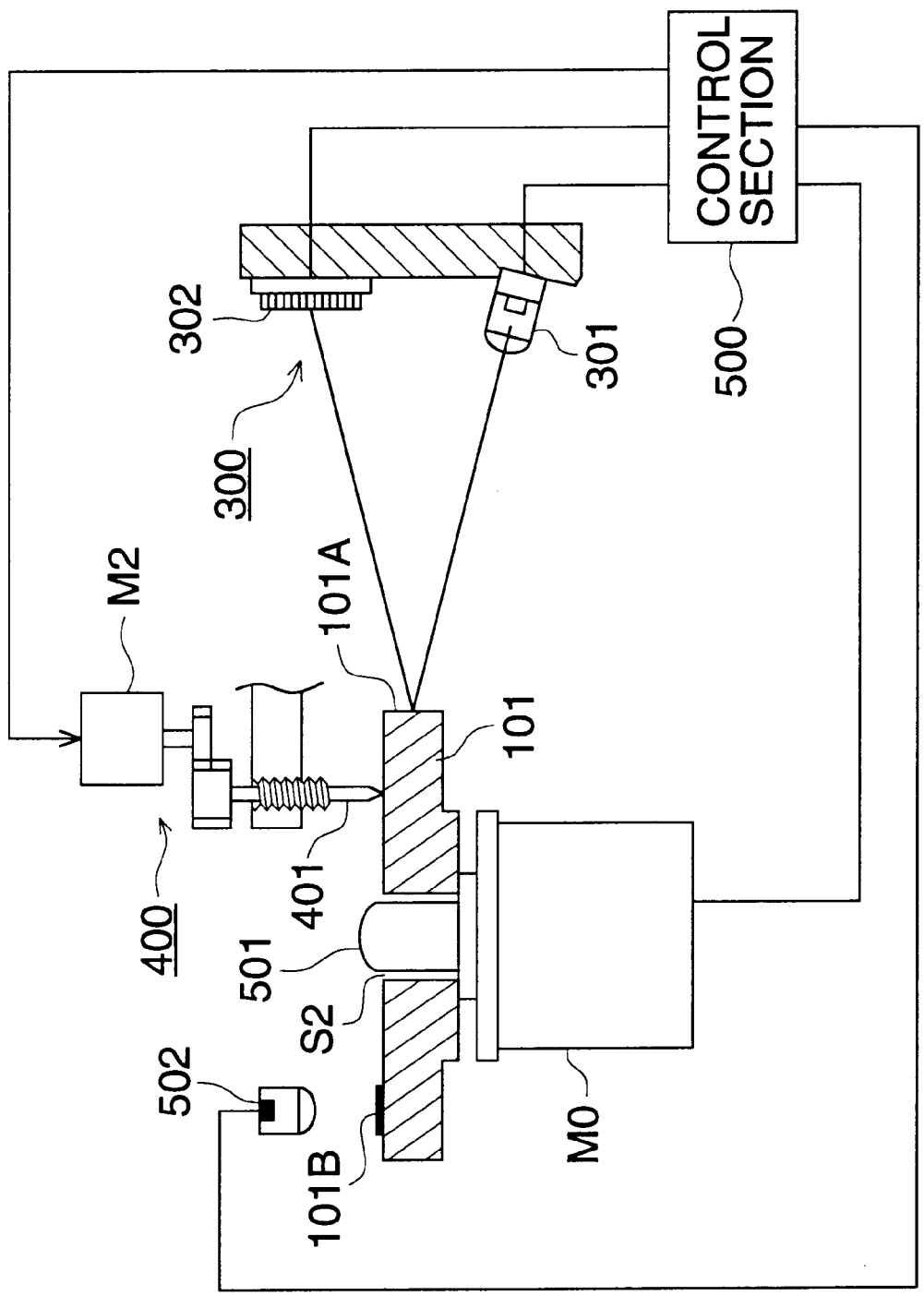
FIG. 8 is a drawing showing the structure of the adjusting apparatus of the optical deflector according to the second embodiment of the adjusting method.

(2) The tilt-angle measuring instrument 300 emits the light beam to the mirror surface 101A positioned opposite the light emitting portion 301, and detects the reflected light at the photodetecting portion 302, thus it measures the tilt angle. The measured results by the photodetecting portion 302 within one rotation of the supporting table are, for example, such as shown in FIG. 7(a). The measured points are represented as ○ marks in the drawing. Although the measured results are shown for the six surface polygonal mirror 101, of course, the invention should not be confined to this number of mirrors. The control unit 200 detects the largest measured value of the tilt angle and the smallest one, and calculates the difference to obtain the range $B_{MAX}$.

(3) Next, either of the two motors M2A or M2B of the two inclination-angle adjusting means 400A or 400B respectively, for example, the motor M2A is rotated in one direction to a reasonable amount to push up the pushing pin, the pushing member 401A, to the corresponding amount, then the range $B_{MAX}^1$ of the measured tilt angle values within one rotation of the supporting table 202 is obtained. The control unit 200 compares it with the former value $B_{MAX}$, and if $B_{MAX} < B_{MAX}^1$, then the motor M2A is rotated in the other direction to an appropriate amount to push down the pushing pin 401A to the corresponding amount, and in this state the range $B_{MAX}^2$ of the measured tilt angle values within one rotation of the supporting table 202 is obtained. If $B_{MAX} > B_{MAX}^2$, then the range $B_{MAX}^3$ in the state after the motor is rotated further in the same direction to a reasonable amount, comparing with the former value $B_{MAX}^2$. Then, such operation as the motor M2A is rotated in the same direction to a reasonable amount, or it is rotated in the other direction to a little amount, according as $B_{MAX}^2 > B_{MAX}^3$ still, or $B_{MAX}^2 < B_{MAX}^3$ is repeated to obtain the position of the pushing pin 401A which minimizes the range $B_{MAX}^N$ of the measured values of the tilt angle. FIG. 7(b) shows the result of the measurement in this state.

(4) Further, the control unit 200, with the pushing pin 401A fixed at the above-mentioned position, causes the motor M2B of the inclination-angle adjusting means 400B to rotate in one direction to a reasonable amount to push up the pushing pin 401B, to the corresponding amount, then the range $B_{MAX}^{N+1}$ of the measured tilt angle values within one rotation of the supporting table 202 is obtained. Comparing it with the previous range $B_{MAX}^N$, the pushing pin 401B is moved in the direction of pushing up or down according to the compared result. Thus, just in the same manner as explained in the paragraph (3), the minute adjustment is made in the direction of making the range of measured values of the tilt angle smaller little by little, and completed by making the range value smaller than the predetermined limit value $B_{AL}$. If the range value does not yet become smaller than the predetermined value $B_{AL}$ after the several time repetition of the above-mentioned comparing of the measured range values and the minute adjustment based on this, the pushing pin 401B is fixed at the position of the smallest range value, and again the minute adjustment is made with the inclination-angle adjusting means 400A repeatedly until the range $B_{MAX}^M$ becomes smaller than the predetermined value $B_{AL}$. FIG. 7(c) shows the measured result at the time of completion of the adjustment.

(5) When the adjustment is finished to make the range of the measured tilt angle values smaller than the predetermined limit value, the processing of making up into one body in the adjusted state is carried out by filling up the gap S1 between the polygonal mirror 101 and the outer ring of the radial bearing 102 with the adhesive.

The adjusting apparatus according to the first embodiment explained above makes the minute adjustment of the tilt angle full-automatically by the control unit 200, however, it may be of such structure that the adjusting is carried out through some manual operations in the intermediate processes.

THE SECOND EMBODIMENT OF THE ADJUSTING METHOD

Referring now to FIG. 8, FIG. 9, and FIGS. 10(a)–10(c), the adjusting apparatus of the optical deflector according to the second embodiment will be explained. Here, the explanation concerning the members of the same function as in the embodiment 1 which are represented by the same signs is omitted. In this part of the second embodiment, it is explained the adjusting apparatus which makes the adjustment of the inclination angle of the polygonal mirror mated with the outside of the motor shaft to cause the variation of the tilt angles of the mirror surfaces of the polygonal mirror to be extremely small, however, in the case of the polygonal mirror mated with the outside of the outer ring of the radial bearing instead of the motor shaft, the adjustment can be made in quite the same manner, by providing a drive-to-rotating member in place of the motor MO explained in the following.

The motor MO is a driving motor capable of high-speed rotation, and the motor shaft 501 of the motor MO is inserted in the polygonal mirror 101. There is a gap S2 of the order of 0.1 mm between the motor shaft and the inner circumference of the polygonal mirror, and the gap is filled up with an adhesive, for example such as an inorganic adhesive. This adjusting method is such as to make adjustment in the semi-solidified state of the adhesive before it sets to be in the solid state.

A mark 101B is put on the upper surface of the polygonal mirror 101, and it is detected by the mark detecting means 502 without contacting. In the control unit 500, it is provided a circuit to judge which surface number among the first through sixth the mirror surface 101A opposite the tilt-angle measuring instrument 300 has, on the basis of the mark detection by the mark detecting means 502. In addition, the explanation is given in this embodiment concerning the six-faced polygonal mirror 101, however, of course, the adjusting method is not to be confined to this number of mirror surfaces.

Figure 9:
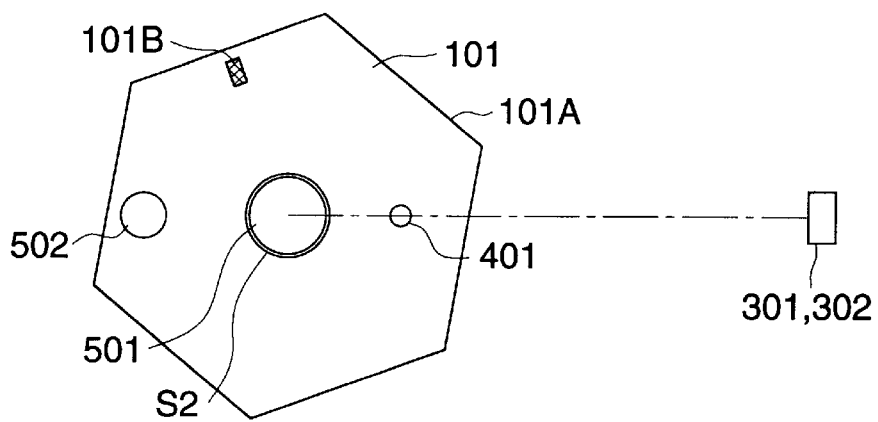
FIG. 9 is the plan view of the polygonal mirror portion in the second embodiment of the adjusting method.

In this embodiment, only one inclination-angle adjusting means 400 is provided, and as shown in the plan view of FIG. 9, the center axis of the motor shaft, pushing pin 401 of the inclination-angle adjusting means 400, the light emitting portion 301 of the tilt-angle measuring instrument 300, and the photodetecting portion 302 are in the relationship of being positioned on the same plane.

According to the adjusting apparatus of this embodiment, such adjustment as follows is made by the adjusting program for the optical deflector comprised in the control unit 500.

Figure 10:
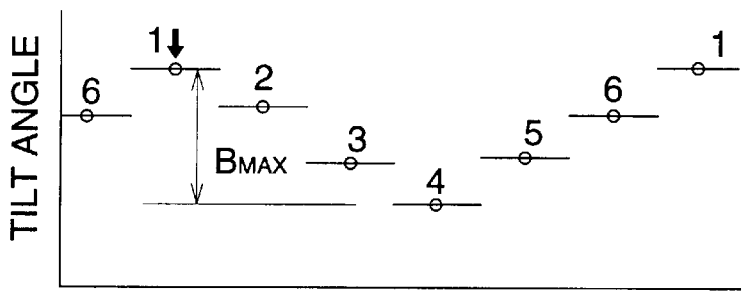
FIGS. 10(a)–10(c) are illustrations showing the process of the adjustment of tilt angles according to the second embodiment of the adjusting method.
Figure 10:
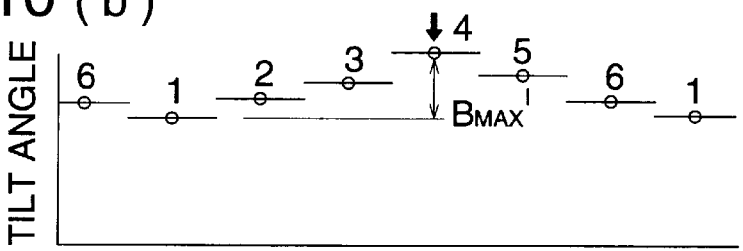
Figure 10:
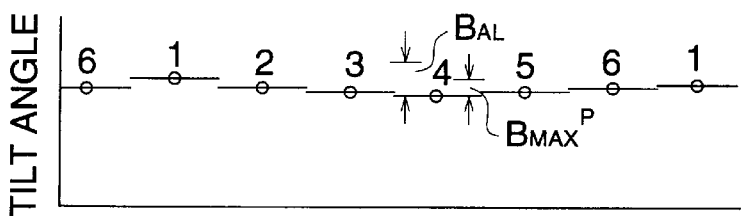

(1) The control unit 500 causes the motor MO to rotate, the light emitting portion 301 of the tilt-angle measuring instrument 300 to emit the light beam to the mirror surface 101A opposite it, and the photodetecting portion 301 to detect the reflected beam, thus the measurement of the tilt angle is made for all the six mirror surfaces. During the above operation, the mark 101B is detected by the mark detecting means 502 to relate the number of the mirror surface to the measured value of its tilt angle. In FIGS. 10(a)–10(c), the measured points are shown by the ○ marks. As shown in FIG. 10(a) as an example of the measured results, the control unit 500 detects the mirror surfaces of the smallest (No. 4) tilt angle and the largest (No. 1) out of all surfaces to obtain the range $B_{MAX}$ of the measured tilt angle values. Then it rotates the polygonal mirror 101 to cause the mirror surface (No. 1) with the largest tilt angle to move to the position opposite the tilt-angle measuring instrument 300 and to stop there. Further, it drives the motor M2 of the inclination-angle adjusting means 400 to push down the pertinent mirror portion to a predetermined amount $\Delta H_1$ in the direction of decreasing the tilt angle of the mirror surface No. 1 by the pushing pin 401, the pushing member.

(2) Again the motor MO is rotated to measure the tilt angles of all the mirror surfaces, with the number of each surface checked at the same time. As shown in FIG. 10(b) as an example of the measured results, the control unit 500 detects the mirror surfaces of the smallest (No. 1) tilt angle and the largest (No. 4) out of all surfaces to obtain the range $B_{MAX}^1$ of the measured tilt angle values. Then it rotates the polygonal mirror 101 to cause the mirror surface (No. 4) with the largest tilt angle to move to the position opposite the tilt-angle measuring instrument 300 and to stop there. Further, it drives the motor M2 of the inclination-angle adjusting means 400 to push down the pertinent mirror portion to a predetermined amount $\Delta H_2$ ($\Delta H_2 < \Delta H_1$) in the direction of decreasing the tilt angle of the mirror surface No. 4 by the pushing pin 401.

(3) The operation as described in the above paragraph (2) is repeatedly continued until the range $B_{MAX}^P$ of the measured values of the tilt angle becomes smaller than the predetermined limit $B_{AL}$ as shown in FIG. 10(c). Then this state of completed adjustment is kept until the adhesive filling up the gap between the motor shaft 501 and the inner circumference of the polygonal mirror 101 is perfectly solidified.

The adjusting apparatus according to the second embodiment explained above makes the minute adjustment of the tilt angle full-automatically by the control unit 500, however, it may be of such structure that the adjusting is carried out through some manual operations in the intermediate processes.

Up to this time, almost nothing concerning the adjustment and assembly of the optical deflector to improve the accuracy in minimizing its tilt angles is introduced. This invention is to provide the adjusting method and adjusting apparatus to make the adjustment in such a manner as to measure the tilt angles of the polygonal mirror surfaces repeatedly so as to minimize the range of the measured values of the tilt angle. According to this invention, by adjusting the inclination angle with regard to the rotary shaft of the motor or the outer ring of the radial bearing, the tilt angle of each mirror surface of the polygonal mirror is adjusted. Hence, a high-degree adjustment which has never been actualized can be made, resulting in providing the optical deflector to actualize a high-image-quality recording.

Furthermore, for the above-mentioned adjusting, there is provided a small gap between the polygonal mirror and the rotating shaft or the outer ring of the radial bearing, which is filled up with an adhesive, and the adhesive is solidified to bond them after the adjustment is completed, thus the assembling is carried out in such a short time as never imagined heretofore and even with a high accuracy.

What is claimed is:

1. An assembling method of an optical deflection apparatus in which a polygonal mirror is fixed on an outer ring of a radial bearing and an optical scanning is conducted by a rotation of said outer ring of the radial bearing, the assembling method comprising the steps of:

(a) placing the polygonal mirror on the outer ring of the radial bearing, wherein the polygonal mirror and the outer ring of the radial bearing have an engagement portion including an adhering portion with a gap having a distance between the polygonal mirror and the outer ring of the radial bearing;

(b) adjusting a tilt angle of the polygonal mirror with respect to the outer ring of the radial bearing; and (c) filling an adhesive in the gap of the adhering portion under the adjusted condition, thereby integrally fixing the polygonal mirror and the outer ring of the radial bearing.

2. The assembling method of claim 1, wherein the engagement portion has a gap for direct fitting the polygonal mirror to the outer ring of the radial bearing and a gap for filling the adhesive at the adhering portion.

3. The assembling method of claim 1, wherein the adhesive has, in its solidified state, a modulus of longitudinal elasticity of 7000 kgf/mm$^2$/° C. or more, and coefficient of thermal expansion of $2 \times 10^{-5}$ or less.

4. The assembling method of claim 1, wherein before the step of filling the adhesive, further comprising the steps of:

measuring the tilt angle of each specular surface on the polygonal mirror with respect to the outer ring of the radial bearing; and adjusting an inclination of the polygonal mirror in a direction in which a dispersion of the tilt angles measured is decreased.

5. An optical deflection apparatus comprising:

(a) a radial bearing having an inner ring and an outer ring; and (b) a polygonal mirror fixed on the outer ring, and an optical scanning being conducted by a rotation of said outer ring of the radial bearing, wherein an adhering portion is provided with a gap having a distance in an engagement portion between the polygonal mirror and the outer ring of the radial bearing which face each other, and an adhesive is filled in the gap of the adhering portion so as to integrally fix the polygonal mirror and the outer ring of the radial bearing.

6. The optical deflection apparatus of claim 5, wherein the engagement portion has a gap for direct fitting the polygonal mirror to the outer ring of the radial bearing of the radial bearing and a gap for filling the adhesive at the adhering portion.

7. The optical deflection apparatus of claim 5, wherein the adhesive has, in its solidified state, a longitudinal elasticity of 7000 kgf/mm$^2$/° C. or more , and coefficient of thermal expansion of $2\times10^{-5}$ or less.

* * * * *